(12) United States Patent
Ros et al.

(10) Patent No.: US 8,982,773 B2
(45) Date of Patent: Mar. 17, 2015

(54) SYSTEM AND METHOD FOR MANAGING MULTIPLE TRANSMISSION RESOURCES OF A SPATIAL MULTI-CELL RADIO-COMMUNICATION SYSTEM

(75) Inventors: Benjamin Ros, Roques (FR); Christelle Boustie, Lauzerville (FR); Gaël Scot, Toulouse (FR)

(73) Assignee: Centre National D'Etudes Spatiales, Paris (FR)

( * ) Notice: Subject to any disclaimer, the term of this patent is extended or adjusted under 35 U.S.C. 154(b) by 85 days.

(21) Appl. No.: 13/566,455

(22) Filed: Aug. 3, 2012

(65) Prior Publication Data

US 2013/0034050 A1 Feb. 7, 2013

(30) Foreign Application Priority Data

Aug. 4, 2011 (FR) ...................................... 11 57151

(51) Int. Cl.
*H04W 72/04* (2009.01)
*H04B 7/185* (2006.01)

(52) U.S. Cl.
CPC ...................... *H04B 7/185* (2013.01)
USPC .......................................................... 370/316

(58) Field of Classification Search
CPC ...... H04W 84/18; H04W 84/12; H04W 16/26; H04W 84/047; H04B 7/155; H04B 7/18582; H04B 7/18584
USPC .......................................... 370/315, 316, 310
See application file for complete search history.

(56) References Cited

U.S. PATENT DOCUMENTS

| 2006/0014543 | A1* | 1/2006 | Drakos ......................... 455/450 |
| 2006/0104334 | A1* | 5/2006 | Hervey et al. ................. 375/133 |
| 2007/0011093 | A1* | 1/2007 | Tree ................................ 705/40 |
| 2011/0188393 | A1* | 8/2011 | Mallik et al. .................. 370/252 |
| 2013/0282863 | A1* | 10/2013 | Sebastian et al. ............. 709/217 |

* cited by examiner

*Primary Examiner* — Andrew Lai
*Assistant Examiner* — Zhiren Qin
(74) *Attorney, Agent, or Firm* — Davidson, Davidson & Kappel, LLC

(57) ABSTRACT

A satellite cellular radio-communication system using beam formation is provided. The system includes a satellite, at least one satellite access station, terminals, at least one control unit of a virtual cell. At least one of the terminals is configured to transmit and receive on a transmission channel having at least two frequency and spatial transmission resources of a same virtual cell that are different by their frequency band, a frequency and spatial transmission resource being a sub-band of a frequency band used in a beam. The frequency band is taken from among a predetermined number of frequency bands and was allocated to said beam according to a reuse function.

8 Claims, 13 Drawing Sheets

SYSTEM AND METHOD FOR MANAGING MULTIPLE TRANSMISSION RESOURCES OF A SPATIAL MULTI-CELL RADIO-COMMUNICATION SYSTEM

This claims the benefit of French Patent Application FR 11 57151, filed Aug. 4, 2011 and hereby incorporated by reference herein.

The present invention relates to a system for managing multiple transmission resources of a spatial multi-cell radio-communication system based upon at least one satellite and a method for managing transmission resources implemented by such a system.

BACKGROUND

Satellite-based multi-cell radio-communication satellite systems already exist, for example such as the THURAYA system.

An ETSI standard, designated "GEO-Mobile Radio Interface Specifications; Part 3: Network Specifications; Sub-part 2: Network architecture; GMR-1 03.002," also defines the architecture of the satellite component of a multi-cell system for narrow bandwidth services in the context of the UMTS (Universal Mobile Telecommunication System).

Standards for new generation land-based systems called pre-fourth generation, or 3.9G, such as LTE (Long-Term Evolution 3GPP Technology) and WIMAX IEEE 802.16 (Worldwide Interoperability for Microwave Access), are in development and propose services with an even higher throughput. The deployment of such 3.9G fourth generation systems began in 2010.

Like third-generation systems, it is interesting to complete the fourth-generation land or terrestrial systems, which are profitable when the densities of user terminals are high, with satellite systems, which become profitable when one wishes to broaden the coverage of the land-based systems in areas with lower user terminal densities than those of the cells of a land system.

Due to the higher throughputs required by the services offered in a fourth generation system, there is a desire to decrease the size of the satellite cells so as to increase the capacity of the satellite system, i.e. the traffic volume that can be managed by the satellite system.

It is known to assign a frequency band to each satellite beam or in a corresponding manner to each satellite cell, following a given frequency reuse scheme.

Like the land case, in the case of narrowband services, it is also known to coordinate a set of transmitting and receiving stations, called "Gateway Transceiver Stations" (GTS), using a Gateway Station Controller (GSC).

These GTS transmitting and receiving stations only perform servile management of the physical layer, i.e. carrying out the implementation of transmissions from a stationary and/or dynamic configuration of the transmission resources allocated for each transmission channel for which the station is responsible and quality measurements by channel.

The configuration is determined by the Gateway Station Controller GSC, the domain of which is the management of the transmission resources of the GTS attached exclusively to it, or in other words, the management of the terminals attached to the cells associated with the GTS.

Such an architecture initially seems transposable to a fourth-generation satellite system.

However, due to the smaller cell size for a fourth-generation satellite system, and a stronger sensitivity to antenna misalignment of the satellite, the number of switches per unit of time of broadband traffic between adjacent cell coverages managed by two different access stations increases.

Flexible and effective management in terms of capacity of the broadband transmission resources that simultaneously guarantees service continuity in terms of absence of interruption and communications appears difficult to achieve with such a directly transposed architecture.

SUMMARY OF THE INVENTION

An effort is being made to make the management of traffic switches and transmission resource changes more flexible and efficient in the satellite system so as to make the decreased size of the cells compatible with the misalignment speeds of the satellite antenna.

To that end, a satellite cellular radio-communication system is provided. The system includes:

a transparent or bent-pipe communication satellite, serving as a relay, placed in a geostationary orbit or a strongly inclined elliptical orbit, at least one satellite access station, transmitting and receiving, configured to transmit and receive service and signal messages to and from the satellite on a first bidirectional wireless way, a set of user terminals configured to receive and transmit the service and signal messages from and to the satellite on a second bidirectional wireless way, the second bidirectional wireless way being made up of a second outbound downlink and a second inbound uplink, at least one control unit of a virtual cell connected to one or more satellite access stations, a virtual cell being a set of frequency and spatial transmission resources, the communication satellite being configured to transmit on the second outbound downlink, and to receive on the second inbound uplink, the service and signal messages received and transmitted by the set of terminals, the service and signal messages being divided into a set of radio-communication satellite beams Fi, each satellite beam F(i) being identified by a first beam identification integer index i, each satellite beam F(i) defining, by its wireless range on the ground, a satellite coverage of a satellite cell, and being associated with the frequency band taken among a predetermined number Nb of different frequency bands B(k), each frequency band B(k) being identified by a second band identification integer index k, with k varying from 1 to Nb, each frequency band B(k) being subdivided into one or more frequency sub-bands SB(k, j), each sub-band being identified by a pair of indices (k, j) in which k is the index of the band and j is an integer comprised between 1 and an integer Nsb(j) depending on k, the set of satellite beams being configured such that a band B(g(i)) allocated according to a distribution function g to any beam i is different from the bands associated with all of the beams adjacent to said any beam F(i), and each satellite access station being associated with a different compact cluster of at least two satellite beams, no cluster taken among any two clusters having a shared beam, a frequency and spatial transmission resource being a sub-band of index j of a band of index k assigned to a beam of index i and is associated with a triplet (i, k, j), and a virtual cell being a set of frequency and spatial transmission resources such that the set of beams to which they belong forms a compact set of beams, and each terminal being associated with a virtual cell and is configured to receive, from the control unit of the associated virtual cell, and run a configuration command for a transmission channel to transmit and receive messages therein, the channel using at least two frequency and spatial resources at the same time having different band indices, each control unit of a virtual cell being configured to manage the frequency and spatial resources of the virtual cell associated with it, and to make the messages received and transmitted by the terminals affected to the virtual cell of the control unit pass through.

According to particular embodiments, the cellular radiocommunication system comprises one or more of the following features:

each sub-band has a wide band width greater than or equal to 2.5 MHz, and each terminal associated with the virtual cell is configured to measure the transmission quality of each sub-band of the virtual cell to which it belongs at the same time;

the number of sub-bands per frequency band is constant, and the sub-bands of a same band have the same width;

each control unit of a virtual cell includes a different reference clock and is configured to synchronize the messages transmitted and received by each terminal of the associated virtual cell on the reference clock of the associated virtual cell;

each satellite access station is configured to transmit and receive messages, corresponding to the associated cluster, and is connected to one or more control units that manage the frequency and spatial resources whereof the beam indices correspond to the beams of the cluster associated with the access station;

a satellite access station is served by at least two control units, and in which at least one of the control units that serves the access station serves all of its frequency and spatial resources on the satellite access station;

a control unit serves at least two access stations;

an access station is served by a single control unit, and the control unit serves only that access station.

A method for changing transmission resources within a same virtual cell during a communication of a terminal in a system as defined above is also provided. The method includes:

the terminal previously attached to a virtual cell has a first list of frequency sub-bands used in the virtual cell, and performs a wide band measurement of the transmission quality of each sub-band of the virtual cell;

the terminal sends to the control unit of the virtual cell, through a first channel using one or more sub-bands of the virtual cell, a first message containing information representative of the quality of each sub-band administered by the control unit of the virtual cell;

the control unit, from the quality information of the sub-bands of the current virtual cell and a second list of free channels of the virtual cell, determines the transmission parameters of a second channel comprising one or more sub-bands that corresponds to wireless reception conditions that are more favorable than those of the first channel, when such a second channel exists;

when a second channel exists, the control unit reserves the sub-band(s) of the second channel, prepares and sends a second message to the terminal containing identification information of the new sub-band(s) of the second transmission channel, and an order to switch from the first channel to the second channel;

after receiving and decoding the second message, the terminal executes the order to switch from the first channel to the second channel and sends the satellite any new message using the sub-band(s) used by the second channel.

A method for changing transmission resources with switching from a first virtual cell to a second virtual cell during switching of a terminal in a system as defined above is also provided. The method includes:

the terminal previously attached to the first virtual cell has a first list of frequency sub-bands used in the first virtual cell, and performs a wide band measurement of the transmission quality of each sub-band of the first virtual cell;

the terminal sends the first control unit C1, through a first transmission channel currently using one or more frequency sub-band(s) of the first virtual cell, a first message containing information representative of the quality of each sub-band administered by the first control unit of the first virtual cell currently in force;

then, the first control unit C1, from quality information of the sub-bands of the current first virtual cell and a set of second lists of sub-bands of adjacent virtual cells in terms of beams, determines whether a second adjacent virtual cell exists in terms of beams capable of providing, for a long period, more favorable wireless reception conditions than those of any channel of the first virtual cell;

when such a second virtual cell exists, a new high throughput connection on the high throughput network side is prepared by the mobile switching center MSC and the second control unit C2 associated with the second virtual cell, and the first control unit C1 sends to the terminal a second message comprising an order to prepare a switch to a second transmission channel, identification information for the second virtual cell to which to switch, and a third list of sub-bands to scan of the second virtual cell to perform a wide band measurement of the set of channels offered by the second virtual cell, after receiving the second message, the terminal sends to the second control unit, through a second transmission channel, a third message containing information representative of the quality of each sub-band administered by the second control unit of the second virtual cell C2;

the second control unit C2, from quality information of the sub-bands of the second virtual cell measured, determined and supplied by the terminal and from a fourth list of free transmission channels of the second virtual cell, determines a third channel formed from one or more sub-bands comprised in the fourth list of free channels of the second virtual cell that corresponds to more favorable wireless reception conditions than those of the first channel;

the second control unit C2 reserves the sub-band(s) of the third channel, prepares and sends, on the second signal channel, a fourth message to the terminal containing identification information of the third channel and the sub-band(s) allocated to the third channel;

the terminal receives and decodes the fourth message, and stores the information on the new sub-band(s) assigned by the second control unit C2, then sends to the first control unit C1 a fifth announcement message that it is ready to switch to the third channel of the second virtual cell;

after having received the fifth message, the first control unit C1 sends an order to the mobile switching center MSC to activate a second connection between the second control unit C2 and the high throughput network, prepares and sends to the terminal a sixth message containing an order to switch to the second control unit C2 of the second virtual cell and to use the third transmission channel;

after receiving and decoding the sixth message, the terminal executes the switching order from the first channel to the third channel and sends any new message on the second control unit.

BRIEF SUMMARY OF THE DRAWINGS

The invention will be better understood upon reading the following description of one embodiment, provided solely as an example and done in reference to the drawings, in which.

DETAILED DESCRIPTION

Figure 1:
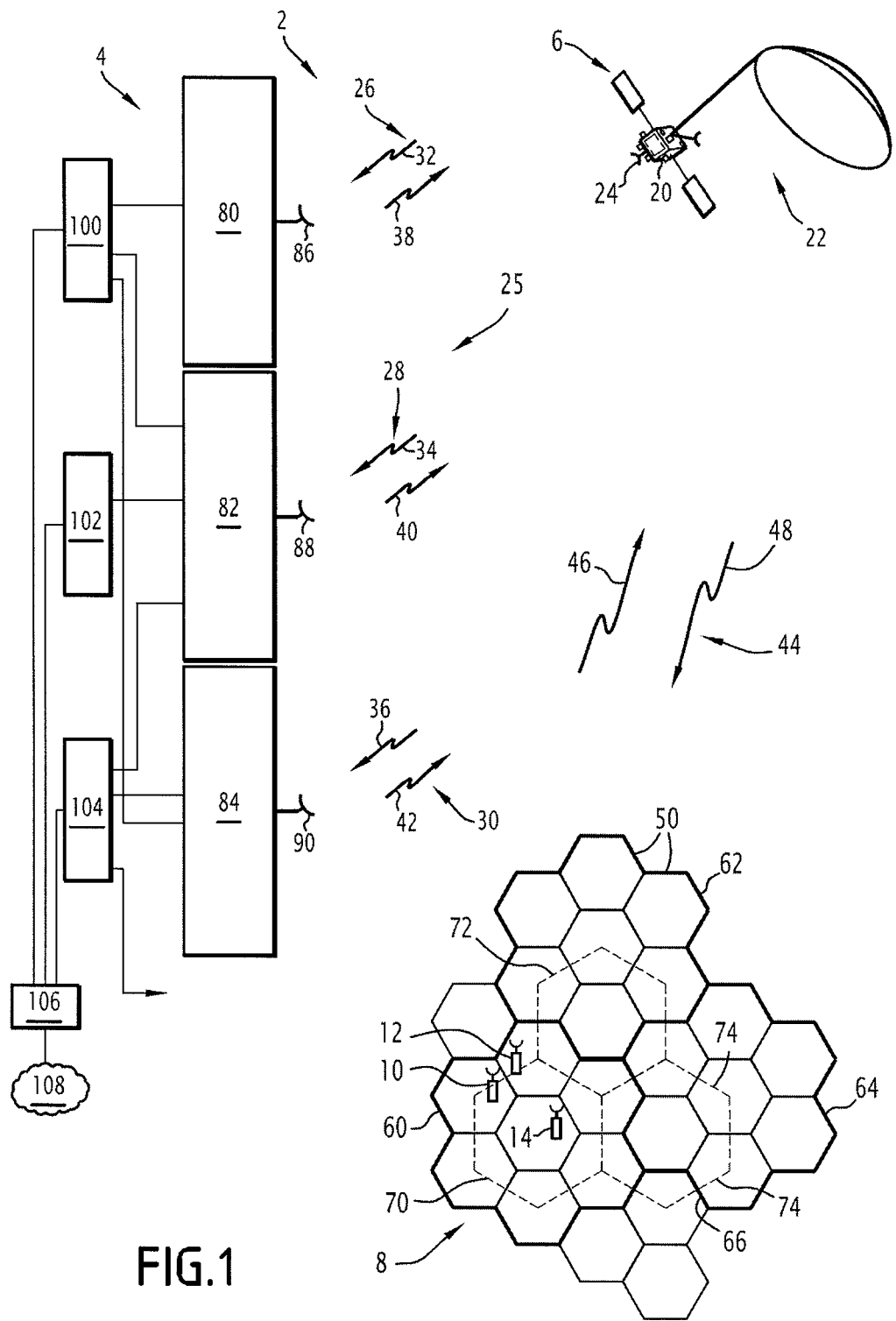
FIG. 1 is the architecture of a first embodiment of a satellite multi-cell radio-communication system according to the invention.

According to FIG. 1, a satellite multi-cell radio communication system 1 comprises a ground telecommunications infrastructure 2, a transparent or bent-pipe communication satellite 6, serving as relay, placed on a geostationary orbit (GEO) or a highly inclined elliptical orbit (HEO), and a set 8 of user terminals or communication service users, only three 10, 12 and 14 of which are shown.

The telecommunications satellite 6 comprises a platform 20, a first multi-beam antenna 22 for transmitting and receiving service and signal messages through wireless signals to and from the terminals 10, 12, 14 with a beam-forming network, a second antenna 24 for transmitting and receiving service and signal messages through wireless signals to and from the ground infrastructure 4, and a transparent repeater, not shown, connecting the first and second antennas 22, 24.

The communications satellite 6 is configured to transmit and receive the service and signal messages through wireless signals to and from the ground infrastructure 4 following a first bidirectional radio wireless way 25 including one or more first satellite two-way links, only three first two-way access links 26, 28, 30 being shown in FIG. 1.

The first two-way links 26, 38, 30 respectively comprise first inbound access downlinks 32, 34, 36 and first outbound access uplinks 38, 40, 42.

The communications satellite 6 is configured to transmit and receive service and signal messages through wireless signals to and from the terminals 10, 12, 14 following a second bidirectional way 44 formed by a second outbound downlink 48 from the first antenna 22 of the satellite 6 to the terminals 10, 12, 14, and a second inbound uplink 46 from the terminals 10, 12, 14 toward the first antenna 22 of the satellite 6.

The first antenna 22 of the satellite 6 is configured so that through wireless signals, the service and signal messages received and transmitted by the set of terminals 10, 12, 14 are divided into a set of radio-communication satellite beams.

According to FIG. 1, as an example, twenty-five beams 50 are shown, the coverage of each of which forms a satellite cell on the ground that diagrammatically has a hexagonal shape.

The beams 50 are grouped together in clusters of beams, only three clusters 60, 62 and 64 being shown here fully, a fourth cluster 66 being partially shown by three beams.

Each cluster 60, 62, 64, 66 has the same structure, here hexagonal, and comprises a central beam surrounded by a peripheral ring of six beams.

Each cluster 60, 62, 64, 66 corresponds, as outlined hereafter, to a periodic reusing pattern of a total allocated frequency band according to a frequency reusing factor depending in particular on the division of the total allocated frequency band into a certain number of frequency bands.

Here, the number of frequency bands is equal to 7.

A first virtual cell 70, illustrated in broken lines in FIG. 1, is a first set of frequency and spatial transmission resources in terms of frequencies and beams, a transmission resource being defined broadly as a portion of a frequency band used in the beam.

A first set of terminals, situated in a compact assembly of beams of the bouquet 60 and using some or all of the frequency bands, is associated with the first virtual cell.

A second virtual cell 72, illustrated in broken lines in FIG. 1, is a second set of frequency and spatial transmission resources.

A second set of terminals situated in two beams of the first cluster 60, in four beams of the second cluster 62, and in one beam of the third cluster 64, partially using the frequency bands of two beams of the first cluster 60, three beams of the second cluster 62 and two beams of the third cluster 64, and completely using the frequency band of a beam of the second cluster, is associated with the second virtual cell 72.

A third virtual cell 74, illustrated in broken lines in FIG. 1, is a third set of frequency and spatial transmission resources.

A third set of terminals, situated in two beams of the first cluster 60, in four beams of the third cluster 64, and one beam of a fourth cluster 66 partially shown, and partially using frequency bands of two beams of the first cluster 60, three beams of the third cluster 64, and the beam of the fourth cluster 66, completely using the frequency band of a beam of the third cluster 64, is associated with the third virtual cell 74.

The terminals 10, 11, 12 are configured to receive and transmit the service and signal messages through the wireless signals from and to the satellite 6 on a second bidirectional wireless way 44.

Each terminal 10, 12, 14 is configured to be associated with a virtual cell.

Each terminal 10, 12, 14 is configured to receive, from the control unit of the associated virtual cell, and carry out a configuration command of a transmission channel to transmit and receive the messages sent to it in the transmission channel, the transmission channel using at least one frequency and spatial resource.

Each terminal 10, 12, 14 is configured to use at least two frequency and spatial resources whereof the frequency bands are different when the conditions for quality wireless reception require it.

The ground infrastructure 4 comprises at least two satellite access stations, for transmission and reception, three access stations 80, 82, 84 being shown in FIG. 1 respectively connected to antennas 86, 88, 90.

The ground infrastructure 4 also comprises at least one control unit 100, 102, 104 for the transmission resources of the virtual cells 70, 72, 74 selectively connected to the satellite access stations 80, 82, 84, a public high throughput or rate network 108, for example the Internet, and a mobile access communications center to connect the control units 100, 102, 104 to the high throughput network 108.

The satellite transmission and reception access stations 80, 82, 84 are configured to transmit and receive the service and signal messages through wireless signals to and from the satellite 6 on the first two-way links 26, 28, 30.

By convention, the satellite access stations 80, 82, 84 are respectively called second, first, and third satellite access stations.

Each satellite transmission and reception access station 80, 82, 84 is associated with a different compact cluster of at least two satellite beams, no cluster among any two clusters having a shared beam. Here, the clusters 60, 62, 64 are respectively associated with the satellite access stations 82, 80, 84.

Each satellite access station 80, 82, 84 is configured to form the beams corresponding to their associated cluster through a transmission diagram specific to the first bidirectional way 25, and to transmit the messages from the terminals in the beams that have been attributed to them by the virtual cell control units, according to a configuration of transmission parameters specific to each terminal and determined by the control unit in charge of the terminal.

Each control unit 100, 102, 104 of a virtual cell is configured exclusively to manage the communications of one virtual cell.

By convention, the control units 100, 102, 104 are respectively called second, first, third control units.

The first virtual cell 70 is exclusively managed by the first coordinating unit 102.

The second virtual cell 72 is exclusively managed by the second coordinating unit 100.

The third virtual cell 74 is exclusively managed by the third coordinating unit 104.

Each virtual cell control unit is configured to allocate transmission resources to the set of terminals of its associated virtual cell through commands sent to the terminals, and to make the messages from the terminals of the virtual cell pass from and to the ground infrastructure 4 through the satellite and one or more satellite access stations.

Each control unit is configured to send the terminal that it manages a configuration command for a transmission channel to transmit and receive in the transmission channel, the transmission channel being able to use a single frequency and spatial resource, several frequency and spatial resources, and in some cases, at least two frequency and spatial resources having different frequency bands.

Figure 2:
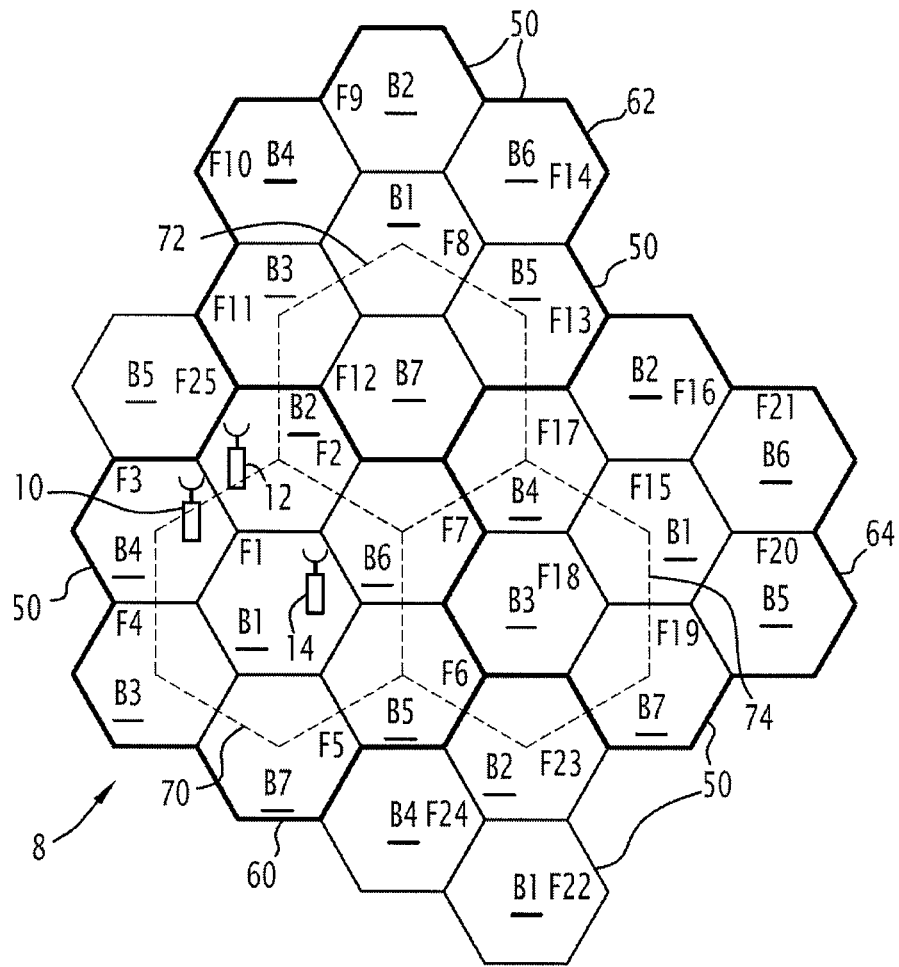
FIG. 2 is a view of the cellular ground coverage of the radio-communication system of FIG. 1.

According to FIG. 2, the beams of FIG. 1 are called F1 to F25, and in general, each satellite beam Fi is uniquely identified by a first beam identifier integer index i.

Each satellite beam Fi defines, through its wireless range on the ground, satellite coverage forming a satellite cell.

A frequency band Bk, taken from a predetermined number Nb of different frequency bands, is associated with each satellite beam Fi and, in a corresponding manner, with each cell.

Each frequency band Bk is identified by a second band identification integer index k, with k varying from 1 to Nb.

It is assumed here that the total band, denoted Btotal, comprises seven bands of equal width, juxtaposed and called B1, B2, B3, B4, B5, B6 and B7.

The set of satellite beams Fi is configured so that a band Bg(i) allocated to any beam Fi according to a distribution function g is different from the bands associated with all of the beams and adjacent to said any beam Fi.

Here in FIG. 2, the frequency bands B1, B2, B3, B4, B5, B6, B7 are respectively allocated in the same order to the beams F1, F2, F4, F3, F6, F7, F5, which form the first cluster 60. In that case, g(1), g(2), g(3), g(4), g(5) g(6), g(7) are respectively equal to 1, 2, 4, 3, 7, 5, 6.

The frequency bands B1, B2, B3, B4, B5, B6, B7 are also respectively allocated in the same order to the beams F8, F9, F11, F10, F13, F14, F12, which form the second cluster 62.

The frequency bands B1, B2, B3, B4, B5, B6, are also respectively allocated in the same order to the beams F15, F16, F18, F17, F20, F21, F19, which form the third cluster 64.

The frequency bands B1, B2, B4 are also respectively allocated in the same order to the beams F22, F23, F24, which partially form the fourth cluster 66.

Each cluster 60, 62, 64, 66 corresponds to a same reusing pattern of the frequency bands, and the spatial distribution function g of the frequency bands Bk in the beams Fi is a reusing function of the frequency bands.

Each cluster comprises at least two satellite beams, no cluster from among any two clusters having a shared beam.

It should be noted that when the size of the beams decreases at constant coverage and constant available onboard power, and on the condition that the misalignment effects and interference between spots remain of the same order of magnitude as the thermal noise, the capacity of the satellite system in terms of throughput accumulated on the coverage is increased.

The terminals 10, 12, 14 are respectively situated in the beams F3, F2 and F7 of the first cluster 60.

The first virtual cell 70 as a set of portions of frequency bands distributed in a set of beams is managed by the first associated control unit 102 to exploit part of the bands B2, B3, B4, B5, B6, B7 associated with the beams F2, F4, F3, F6, F7, F5 of the first cluster 60, and to completely exploit the band B1 of the beam F1 of the first cluster 60.

The second virtual cell 72 as a set of portions of frequency bands distributed in a set of beams is configured through the second associated coordinating unit 100 to exploit part of the bands B1, B3, B5 associated with the beams F8, F11, F13 of the second cluster 62, to exploit part of the bands B2, B6 associated with the beams F2, F7 of the first cluster 60, to exploit part of the band B4 associated with the beam F17 of the third cluster 64, and to fully exploit the band B7 of the beam F12 of the second cluster 62.

The third virtual cell 74 as a set of portions of frequency bands distributed in a set of beams is configured through the associated coordinating unit 104 to exploit part of the bands B4, B7 associated with the beams F17, F19 of the third cluster 64, to exploit part of the bands B5, B6 associated with the beams F6, F7 of the first cluster 60, to exploit part of the band B2 associated with the beam F23 of the fourth cluster 66, and to fully exploit the band B3 of the beam F18 of the third cluster 64.

The three portions of the band B6 of the beam F7, used by the first, second, third virtual cells 70, 72, 74, have no overlap and together form the band B6.

Figure 3:
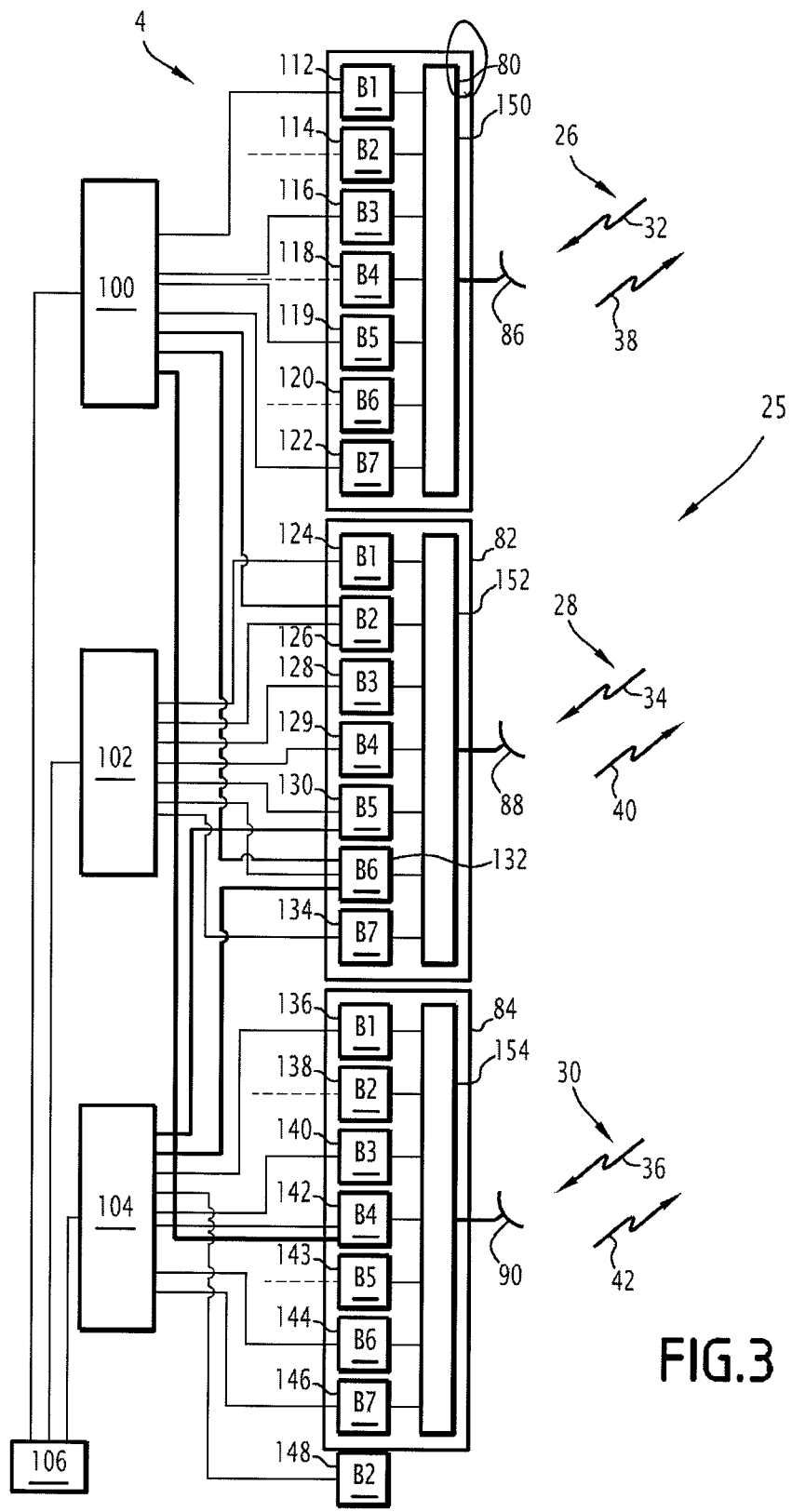
FIG. 3 is a detailed view of the ground infrastructure for accessing the satellite of the radio-communication system of FIG. 1.

FIG. 3 shows a high-level architecture of the satellite access stations as illustrated in all of the connections connecting the control units 100, 102, 104 to the satellite access stations 80, 82, 84 and to the mobile switching center 106.

Each access station 80; 82; 84 respectively comprises seven frequency transposition units 112, 114, 116, 118, 119, 120, 122; 124, 126, 128, 129, 130, 132, 134; 136, 138, 140, 142, 143, 144, 146 in and from a different frequency band on the side of their respective satellite access antenna 86, 88, 90 and a multiplexing and de-multiplexing unit 150, 152, 154 with the transposition for each to and from a different access carrier.

In the second satellite access station 80, the transposition units 112, 114, 118, 119, 120, 122 are associated with the frequency bands B1, B2, B3, B4, B5, B6, B7 and with an access carrier corresponding to the cluster 62.

In the first satellite access station 82, the transposition units 124, 126, 128, 129, 130, 132, 134 are associated with the frequency bands B1, B2, B3, B4, B5, B6, B7 and with an access carrier corresponding to the cluster 60.

In the third satellite access station 84, the transposition units 136, 138, 140, 142, 143, 144, 146 are associated with the frequency bands B1, B2, B3, B4, B5, B6, B7 and with an access carrier corresponding to the cluster 64.

It is assumed here that a bi-univocal correspondence exists between the frequency plan of the first bidirectional way 25 and the frequency and spatial distribution of the satellite beams of the second bidirectional way 44.

The first control unit 102 that manages the first virtual cell 70 is connected to each transposition unit 124, 126, 128, 129, 130, 132, 134 of the first access station 82.

The first control unit 102 completely manages the band B1 and therefore all of the transmission channels using the band B1 in the first cluster 60.

The first control unit 102 partially manages each of the bands B2, B3, B4, B5, B6, B7 of the first cluster 60, and therefore part of the transmission channels using each of the bands B2, B3, B4, B5, B6, B7.

The second control unit 100 that manages the second virtual cell 72 is connected to the transposition units 126, 132 of the first access station, the transposition units 112, 116, 119, 122 of the second access station 80, and the transposition unit 142 of the third access station 84.

The second control unit 100 completely manages the band B7, and therefore all of the transmission channels using the band B7 in the second cluster 62, and therefore all of the transmission channels using the band B7 in the second cluster 62.

The second control unit 100 manages part of each of the bands B2, B6 of the first cluster 60, each of the bands B1, B3, B5 of the second cluster 62, and the band B4 of the third cluster 64, and therefore part of the transmission channels using the aforementioned bands.

The third control unit 104, which manages the third virtual cell 74, is connected to the transposition units 130, 132 of the first access station 82, the transposition units 136, 140, 142, 146 of the third access station 84, and a transposition unit 148 of a fourth access station not shown in FIG. 3.

The third control unit 104 completely manages the band B3, and therefore all of the transmission channels using the band B3 in the third cluster 64, and therefore all of the transmission channels using the band B3 in the second cluster 64.

The third control unit 104 manages part of each of the bands B5, B6 of the first cluster 60, each of the bands B1, B4, B7 of the third cluster 64, and the band B2 of the fourth cluster 66, and therefore part of the communication links using the aforementioned bands.

Figure 4:
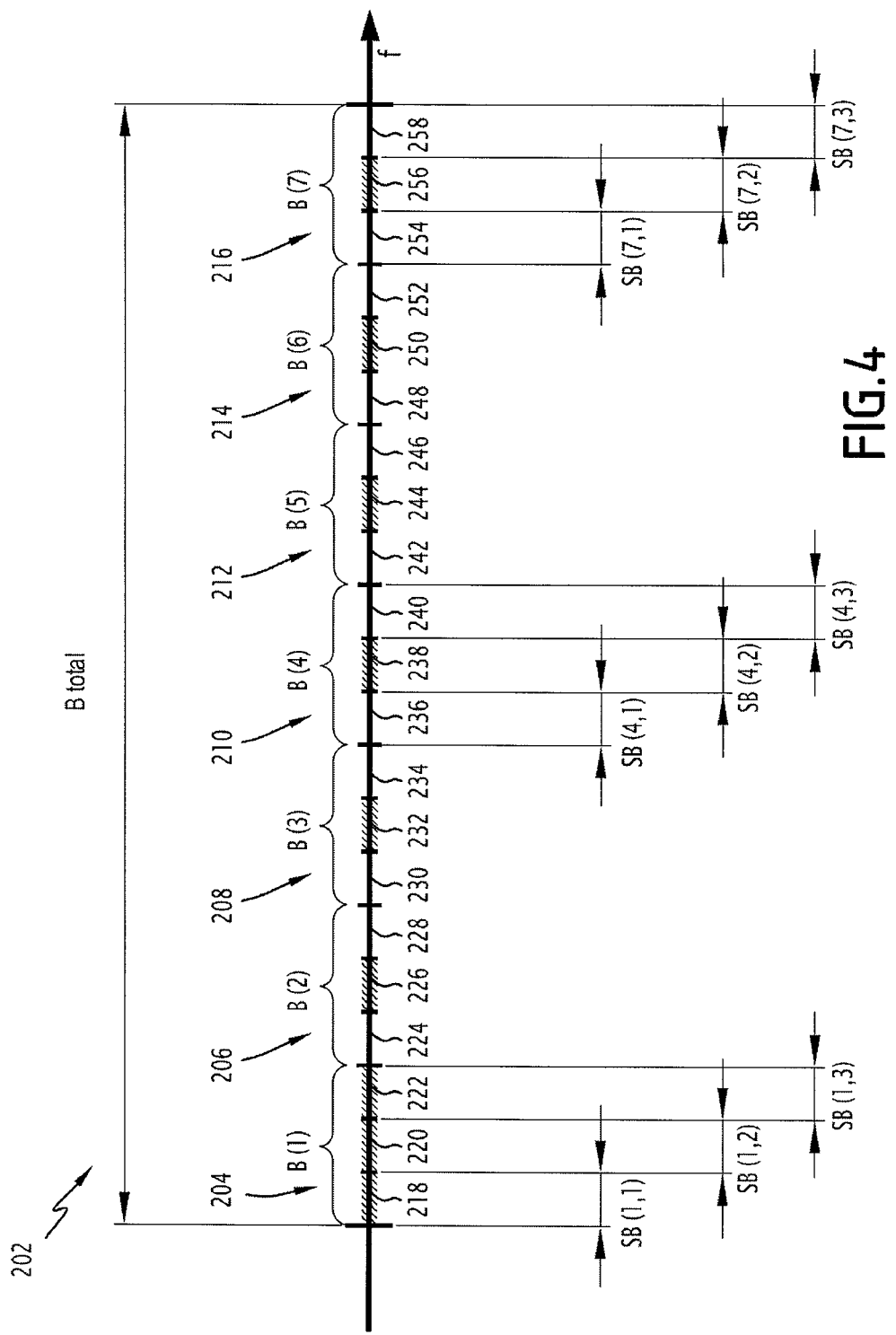
FIG. 4 is a view of an example of the distribution of the frequency bands and sub-bands of a cluster of satellite beams of FIG. 2 managed by a control unit of the virtual cell.

FIG. 4 shows one example of distribution of the frequencies of the first virtual cell 70 used within the total band.

A total band 202 allocated to the first cluster 60 is divided into seven bands 204, 206, 208, 210, 212, 214, 216 forming a sequence of adjacent bands of equal width.

The first band 204 is associated with band B1 or B(1) so as to show a band index k, here equal to 1.

Similarly, the second band 206 adjacent to the first band 204 is designated by B(2).

The bands 208, 210, 212, 214, 216 are respectively designated by B(3), B(4), B(5), B(6), B(7).

Each band 204, 206, 208, 210, 212, 214, 216 is respectively subdivided into three sub-bands 218, 220, 222, 224, 226, 228, 230, 232, 234, 236, 238, 240, 242, 244, 246, 248, 250, 252, 254, 256 and 258.

Each sub-band is designated univocally by SB(k,j) in which k designates the band Bk index to which the sub-band SB(k,j) belongs and j designates a sub-band rank in relation to the band Bk.

For example, the sub-bands 218, 220, 222 of the band B(1) are respectively designated by SB(1,1), SB(1,2) and SB(1,3).

Similarly, the sub-bands 236, 238, 240 of the band B(4) are respectively designated by SB(4,1), SB(4,2) and SB(4,3) and the sub-bands 254, 256, 258 of the band B(7) are respectively designated by SB(7,1), SB(7,2) and SB(7,3).

The sub-bands exploited by the first virtual cell 70 and therefore by the first control unit 102 are the sub-bands SB(1, 1), SB(1,2), SB(1,3), SB(2,2), SB(3,2), SB(4,2), SB(5,2), SB(6, 2) and SB(7,2) of the total band of the first cluster.

The sub-bands of the first virtual cell 70 are each shown in FIG. 4 by a crosshatched line segment.

It should be noted that the illustration of the distribution of the frequencies used by the first virtual cell 70 is simplest here, due to the fact that the allocated band 202 is a frequency band allocated to a same cluster. Here, the representation provided as a projection of the frequency and spatial resources of the first virtual cell 70 over a space of the frequency bands is identical to the distribution of the frequency bands transmitted and received by a same access station.

In general, to completely and uniquely define the frequency and spatial transmission resources, the index of the beam i with which the frequency band Bk is associated should be added to the frequency representation according to the distribution function g.

Here in FIG. 4, the indices i of the beams Fi respectively associated with the frequency bands B(1), B(2), B(3), B(4), B(5), B(6), B7 are 1, 2, 3, 4, 5, 6, 7.

In the case of the second virtual cell 72 and third virtual cell 74, the frequency distribution should be shown in a frequency foliage with several total frequency band leaves, a leaf being the set of frequencies contained in the total band of a same cluster.

In the case of the second virtual cell 72, the leaves are the total bands of the first, second and third clusters, 60, 62, 64.

In the case of the third virtual cell, the leaves are the total bands of the first, third, and fourth clusters, 60, 62, 64, 66.

For example, with notations similar to that of FIG. 4, the sub-bands exploited by the second virtual cell 72, and therefore by the second coordinating unit 100, are the sub-bands SB(2,1), SB(6,1) of the total band of the first cluster 60, the sub-bands SB(7,1), SB(7,2), SB(7,3), SB(3,1) SB(1,1), SB(5,1) of the second cluster 62 and the sub-band SB(4,1) of the third cluster 64.

In this way, the transmission resources of the second virtual cell 72 can be shown by the set of triplets (8, 1, 1), (7, 6, 1), (11, 3, 1), (17, 4, 1), (13, 5, 1), (2, 2, 1), (12, 7, 1), (12, 7, 2), (12, 7, 3) in which the first, second, third indices respectively designate the beam index i, the band index k, and the sub-band index j.

For example, with notations similar to those of FIG. 4, the sub-bands exploited by the third virtual cell 74, and therefore by the third control unit 104, are the sub-bands SB(5,3), SB(6,3) of the first cluster 60 and the sub-bands SB(4,2), SB(3,1), SB(3,2), SB(3,3), SB(1,1)SB(7,1) of the total band of the third cluster 64, and the sub-band SB(2,1) of the fourth cluster 66.

In this way, the transmission resources of the third virtual cell 74 can be shown by the set of triplets (15, 1, 1), (23, 2, 1), (18, 3, 1), (18, 3, 2), (18, 3, 3), (17, 4, 2), (6, 5, 3), (7, 6, 3), (19, 7, 1) in which the first, second, third indices respectively designate the beam index, the band index, and the sub-band index.

Figure 5:
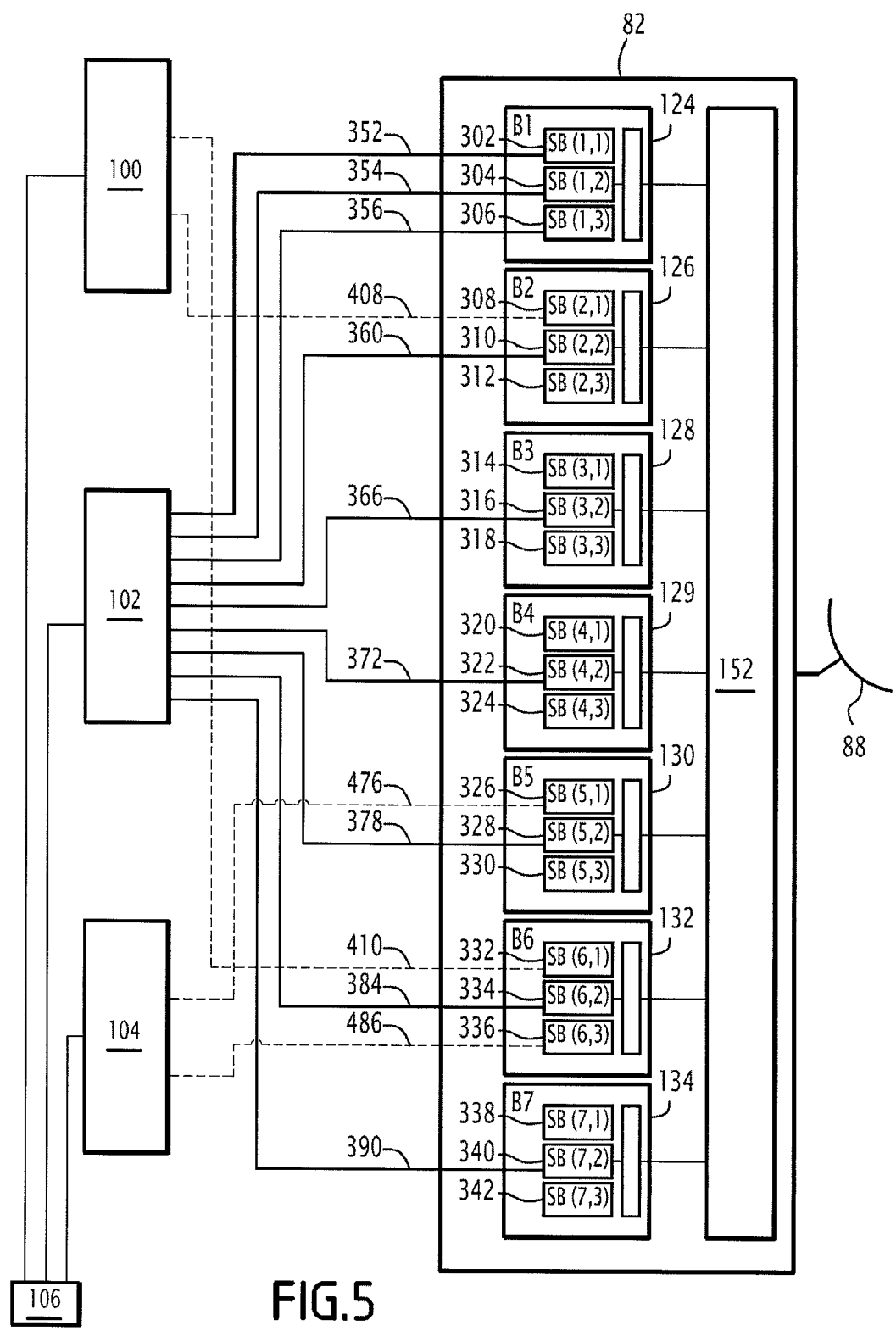
FIG. 5 is a still more detailed view of the architecture of a satellite access station of FIG. 3 associated with a cluster with its interfaces to the control units and according to the distribution of the sub-bands of FIG. 4.

According to FIG. 5, a detailed view of the architecture of the first satellite access station 82 and its interconnections with the control units 100, 102, 104, compatible with the configuration of the virtual cell described in FIG. 4, identically copies the elements of FIG. 3.

Each transposition unit in and from a band B(k), i varying from 1 to 7, i.e. the units 124, 126, 128, 129, 130, 132, 134, each respectively comprise three transposition units in a sub-band SB(k, j), j varying from 1 to 3.

The transposition unit 124 comprises transposition units in a sub-band 302, 304, 306, respectively associated with the sub-bands SB(1, 1), SB(1, 2), SB(1, 3).

The transposition unit 126 comprises transposition units in a sub-band 308, 310, 312 respectively associated with the sub-bands SB(2, 1), SB(2, 2), SB(2, 3).

The transposition unit 128 comprises transposition units in a sub-band 314, 316, 318 respectively associated with the sub-bands SB(3, 1), SB(3, 2), SB(3, 3).

The transposition unit 129 comprises transposition units in a sub-band 320, 322, 324 respectively associated with the sub-bands SB(4, 1), SB(4, 2), SB(4, 3).

The transposition unit 130 comprises transposition units in a sub-band 326, 328, 330 respectively associated with the sub-bands SB(5, 1), SB(5, 2), SB(5, 3).

The transposition unit 132 comprises transposition units in a sub-band 332, 334, 336 respectively associated with the sub-bands SB(6, 1), SB(6, 2), SB(6, 3).

The transposition unit 134 comprises transposition units in a sub-band 338, 340, 342 respectively associated with the sub-bands SB(7, 1), SB(7, 2), SB(7, 3).

The transposition units in a sub-band 302, 302, 306, 310, 316, 322, 328, 334, 340 are connected to the first control unit 102 through respective connecting links 352, 354, 356, 360, 366, 372, 378, 384, 390, shown in solid lines and serving to relay the transmission channels using the transmission resources of the first virtual cell 70 according to the frequency plan of FIG. 4.

The transposition units in a sub-band 308, 334 are connected to the second control unit 100, through respective connecting links 408, 410 shown in dotted lines, and serving to partially relay the transmission resources of the second virtual cell 72.

The transposition units in a sub-band 326, 336 are connected to the third control unit 104, through respective connecting links 476, 486 shown in dotted lines, and serving to partially relay the transmission resources of the third virtual cell 74.

Figure 6:
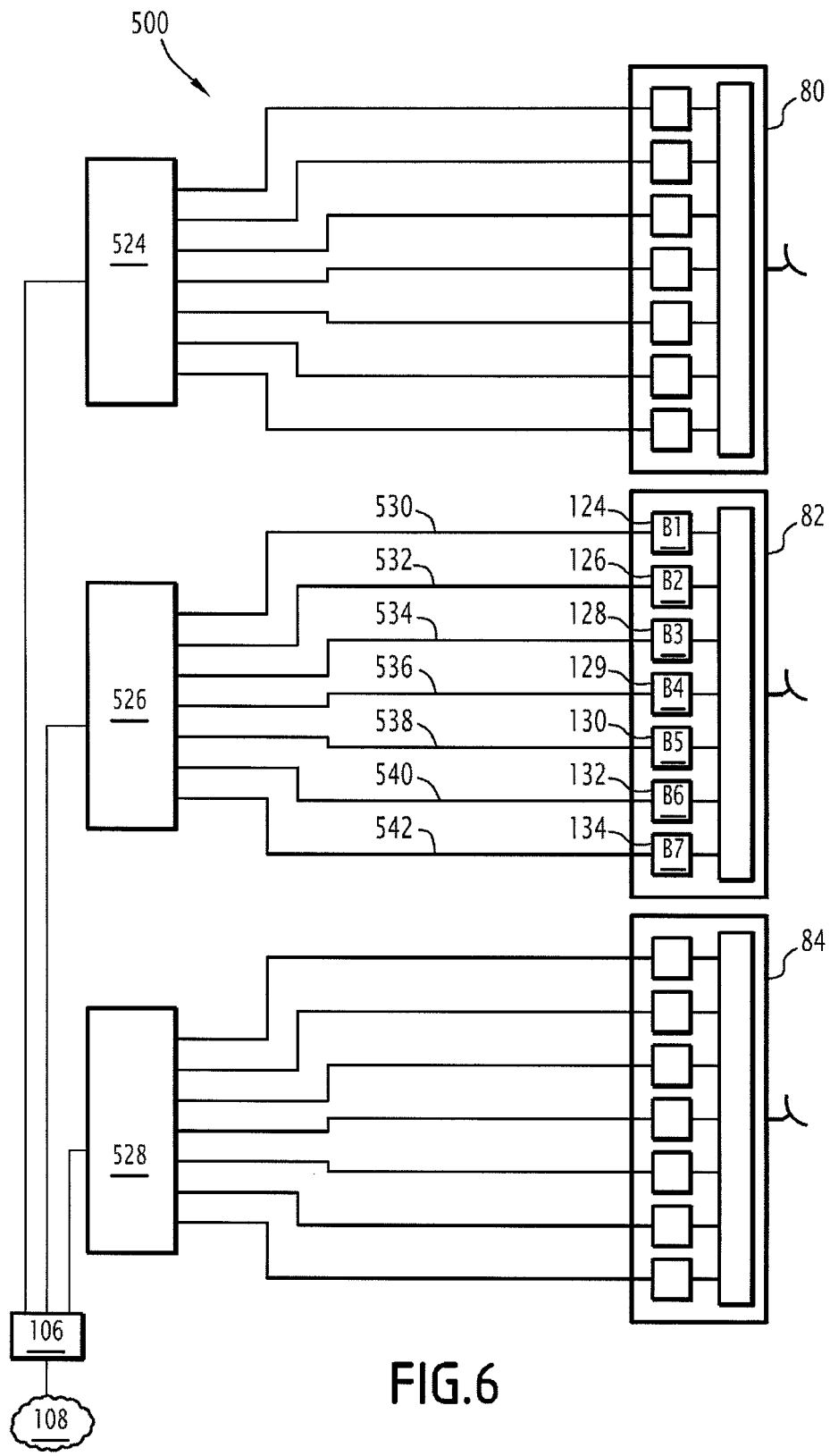
FIG. 6 is a detailed view of a second configuration of the ground infrastructure for accessing the satellite corresponding to a second embodiment of the cellular radio communication system of FIG. 1.

According to FIG. 6, a second embodiment of the multi-cell radio communication system is shown, in which each virtual cell exploits all of the frequency bands of a different cluster of beams.

The three satellite access stations 80, 82, 84 illustrated are identical to those of FIGS. 1 and 3, and the distribution of the frequency bands in the beams of FIG. 1 is identical to that of FIG. 2.

Three coordinating stations 524, 526, 528, each associated with a different virtual cell are each respectively connected to a different satellite access station 80, 82, 84.

Here, each virtual cell is combined, in terms of beams, with all of the coverage of the cluster with which it is associated.

Each frequency band transposition of a same satellite access station is connected to the control station associated with the access station.

For example, each transposition unit 124, 126, 128, 129, 130, 132, 134 of the first access station 82 is connected to the first control unit 526 through respective connecting links 530, 532, 534, 536, 538, 540, 542.

It is assumed here, as in the first embodiment, that each band B(k) is subdivided into three sub-bands SB(k, j), j varying from 1 to 3, and each transposition unit comprises three sub-band transposition units not shown in FIG. 6.

The first virtual cell control unit 526 is configured to manage communications in which the assigned transmission channels use at least two sub-bands as transmission resources, two of them each belonging to a different frequency band.

For example, the control unit 526 can process the sub-band SB(1, 2) and the sub-band SB(7, 2) assigned to the first cluster as resources for a same transmission channel.

Figure 7:
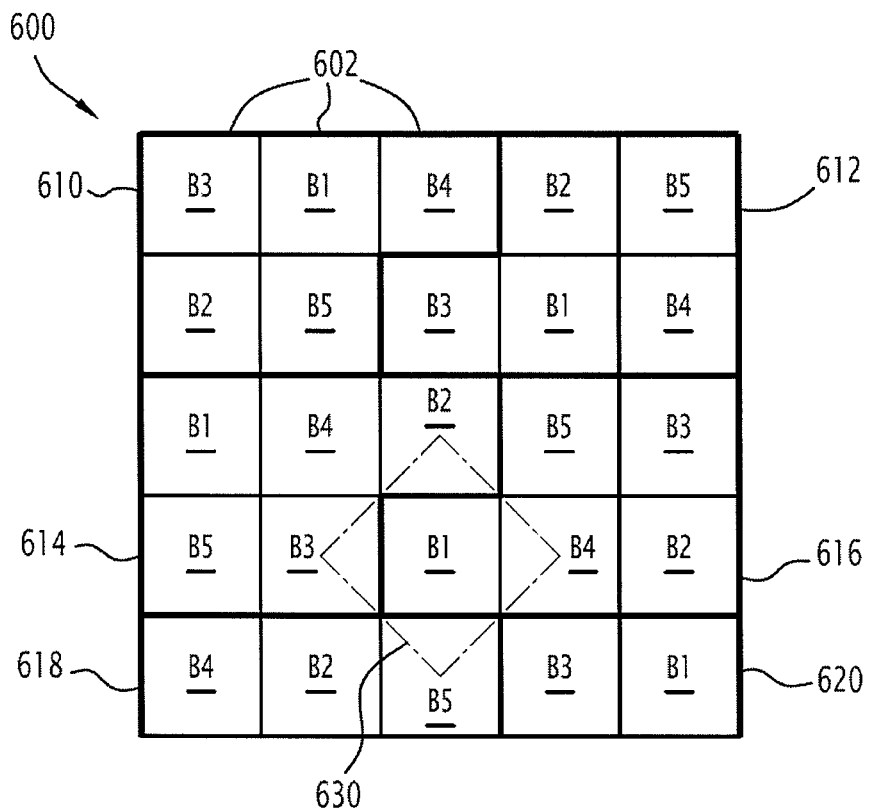
FIG. 7 is a view of a first alternative of a satellite coverage of FIGS. 1 and 3 with clusters of five square-shaped beams reusing five frequency bands.

FIG. 7 illustrates a coverage alternative 600 of beams 602 and frequency band distribution in the beams.

Here, 25 beams are shown and arranged in five rows of five beams having a square shape.

Allocated to the beams of the first row at the top of FIG. 7, from left to right, are respectively the frequency bands B3, B1, B4, B2, B5, in that order.

Allocated to the beams of the second row, from left to right, are respectively the frequency bands B2, B5, B3, B1, B4, in that order.

Allocated to the beams of the third row, from left to right, are respectively the frequency bands B1, B4, B2, B5, B3, in that order.

Allocated to the beams of the fourth row, from left to right, are respectively the frequency bands B5, B3, B1, B4, B2, in that order.

Allocated to the beams of the fifth row, from left to right, are respectively the frequency bands B4, B2, B5, B3, B1, in that order.

A first cluster 610, the contour which is drawn in bold lines, comprises the first three beams of the first row and the first two beams of the second row.

A second cluster 612, the contour which is conjugated with the contour of the first cluster 610, comprises the last two beams of the first row and the last three beams of the second row.

A third cluster 614, the contour which is drawn in bold lines, comprises the first three beams of the third row and the first two beams of the fourth row.

A fourth cluster 616, the contour which is conjugated with the contour of the third cluster, comprises the last two beams of the third row and the last three beams of the fourth row.

A fifth cluster 618, partially shown in FIG. 7, comprises the first three beams of the fifth row.

A sixth cluster 620, partially shown in FIG. 7, comprises the first three beams of the fifth row.

With such a configuration, like the configuration of the hexagonal clusters of beams of FIGS. 1 and 2, each cluster 610, 612, 614, 616 corresponds to a same reusing pattern of the frequency bands, and comprises at least two satellite beams, here five beams, no cluster taken from among any two clusters having a shared beam.

Each cluster 610, 612, 614, 616, 618, 620 is associated with a different satellite access station.

A virtual cell 630 is shown as an example and managed by a control unit, not shown.

The virtual cell 630 comprises frequency and spatial transmission resources, which are the sub-bands of the entire frequency band B1 of the third beam starting from the left of the fourth row, and the sub-bands of part of bands B2, B3, B4 and B5 of the beams adjacent to the sides of the third beam of the fourth row.

Figure 8:
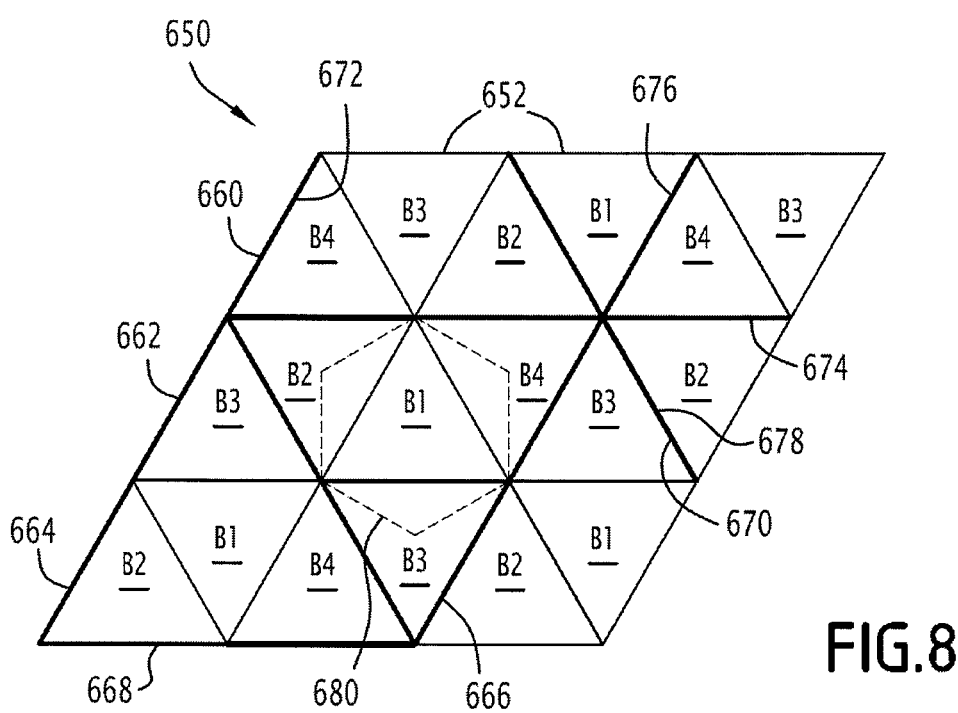
FIG. 8 is a view of a second alternative of a satellite coverage of FIGS. 1 and 3 with clusters of four triangular-shaped beams and reusing four frequency bands.

FIG. 8 proposes a second coverage alternative 650 of beams 652 and frequency band distribution in the beams.

In this alternative, the shape of the section of any beam 652 is triangular.

Here, 18 beams 652, generally forming a diamond, are shown and arranged in three rows 660, 662, 664 of six beams, two adjacent triangles of a same row being arranged head to tail.

The total frequency band Btotal is subdivided into four bands B1, B2, B3 and B4.

Allocated to the beams of the first row 660, from left to right, are respectively the frequency bands B4, B3, B2, B1, B4, B3, in that order.

Allocated to the beams of the second row 662, from left to right, are respectively the frequency bands B3, B2, B1, B4, B3, B2, in that order.

Allocated to the beams of the third row 664, from left to right, are respectively the frequency bands B2, B1, B4, B3, B2, B1, in that order.

A first cluster 666, the triangular contour of which is drawn in bold lines, comprises the second, third and fourth beams of the second row 662 and the fourth beam of the third row 664 starting from the left.

A second cluster 668, the contour of which is conjugated with the contour of the first cluster 666 and drawn in bold lines, comprises the first beam of the second row 662 and the first three beams of the third row 664.

A third cluster 670, partially illustrated in FIG. 8, comprises the fifth beam of the second row 662 starting from the left and the last two beams of the third row 664.

A fourth cluster 672, partially illustrated in FIG. 8, comprises the first three beams of the first row 660.

A fifth cluster 674, partially illustrated in FIG. 8, comprises the last two beams of the first row 660.

A sixth cluster 676 and a seventh cluster 678, partially illustrated in FIG. 8, respectively comprise the fourth beam of the first line 660 and the last beam of the second line 662.

With such a configuration, like the configuration of the hexagonal or square clusters of beams, each cluster 610, 612, 614, 616 corresponds to a same reusing pattern of the frequency bands, and each cluster comprises at least two satellite beams, here five beams, no cluster taken among any two clusters having a shared beam.

Each cluster 666, 668 is associated with a different satellite access station.

A virtual cell 680 is shown as an example by a hexagonal contour in dotted lines.

The transmission resources making up the virtual cell 680 are managed by a control unit (not shown) and comprise the band B1 of the central beam of the first cluster 666 and the band portions B2, B3, B4 of the beams adjacent to the central beam by one side.

Figure 9:
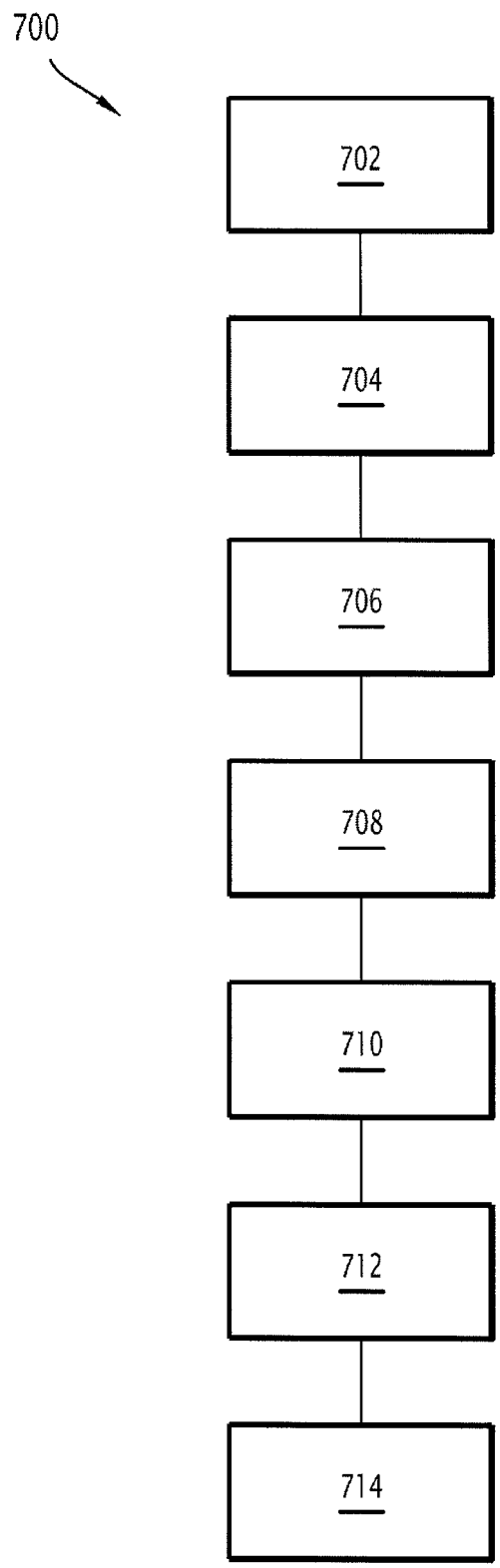
FIG. 9 is a flowchart for the management of the transmission resources of a virtual cell of the multi-cell radiocommunication system of FIG. 1.

According to FIG. 9, a method 700 for managing transmission resources of the system of FIG. 1 applied to any user terminal managed by one or more coordinating units comprises a set of steps 702, 704, 706, 708; 710, 712 and 714.

In the first step 702, the terminal performs a wide band measurement of the qualities of the wireless signals received in the frequency sub-bands of the virtual cell on which it depends.

In the second step 704, the terminal sends, on its communication channel currently in force, transmission quality information, called CQI, representative of the transmission quality of the frequency sub-bands of the virtual cell on which the terminal depends.

In the third step 706, the access station that serves the beam in which the user terminal is located retransmits the CQI information to the control unit, which manages the virtual cell on which the terminal depends.

In the fourth step 708, the coordinating unit implements various algorithms for determining transmission parameters of the transmission channel that the terminal must use, which must include an algorithm for determining one or more sub-bands and corresponding beams.

The other algorithms for determining the transmission parameters of the transmission channel are, for example, algorithms for determining the spreading codes and/or time slots, algorithms for adapting the coding rate using one or more codes, algorithms for adapting various modulations through their number of states, or power adaptation algorithms. The tasks for implementing the algorithms are assumed here to be carried out only at the control unit, the tasks performed by the access station being limited to the formation of beams and the charging of each of the beams as a function of the allocated sub-bands of the transmission channels of the terminals.

Thus, in step 708, the control unit allocates each transmission resources to each user terminal for which it is responsible, said transmission resources at least comprising frequency sub-bands associated with beams and, if applicable, other resources including durations, frequency sub-bands, codes, which correspond to better propagation performance or better capacity performance in terms of throughput for the system, this being done after the CQI information quality measurements of the virtual cell sent by the terminal.

The transmission resources must comprise channels operating in one or more sub-bands, the width of a sub-band being equal to at least 2.5 MHz.

In step 708, the control unit develops and sends to the terminal a control message included in a signaling signal.

When the Channel Quality Information CQI sent by the terminal indicates that it is preferable to use a transmission resource other than that currently in force, the control unit allocates a new transmission channel in the control message and indicates to the terminal that its data is using another transmission channel.

In step 708, the control unit continues to receive on the first channel, and in parallel receives on the second transmission channel that was prescribed to the terminal.

In step 710, the terminal receives, on the first channel, the order to switch to the second channel for transmission and reception.

The terminal prepares the implementation of the transmission on the second channel and then switches onto the second channel and transmits the service and signal messages on the second channel.

In step 712, the access station, which was configured to associate the second channel with the terminal, re-conveys the wireless signal that was transposed and amplified to the control unit.

In step 714, when the control unit receives the messages from the terminal on the second channel, the control unit releases the resources of the first channel, which become available.

Figure 10:
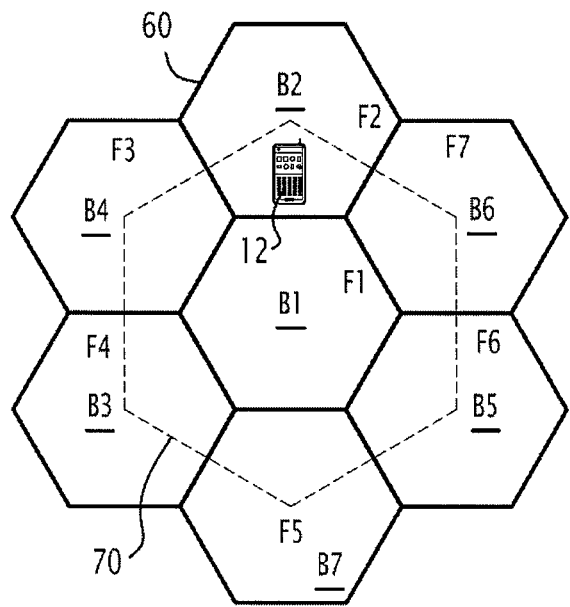
FIG. 10 is a view of a first relative position of a terminal in relation to the satellite cells of a same cluster of beams in which it is located.

FIG. 10 shows a first position of the terminal 12 in relation to the first cluster 60 at a first moment t1.

In this configuration, the terminal 12 is situated in the coverage of the beam F2 that operates in the band B2.

In this configuration, it has been determined beforehand to attach the terminal 11 to the first virtual cell 70 managed by the first coordinating unit 102.

Figure 11:
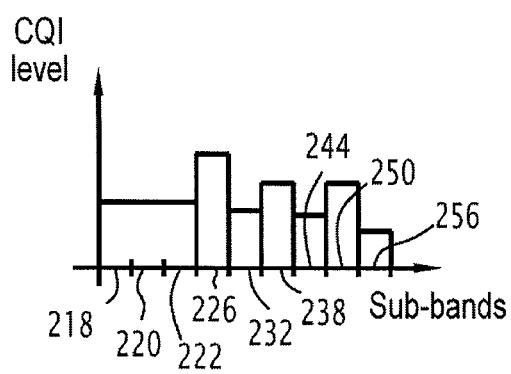
FIG. 11 is a view of the reception status by the terminal of FIG. 10 of the powers received in the various sub-bands of its virtual cell when the terminal is in the first position.

According to FIG. 11, the terminal 12 is located under transmission conditions favorable to receiving, in order of preference, signals in the sub-band 226 of B2, then in the sub-band 238 of B4 and the sub-band 250 of B6, then in the band B1, then in the sub-band 232 of B3 and the sub-band 244 of B5, then in the sub-band 256 of B7.

Figure 12:
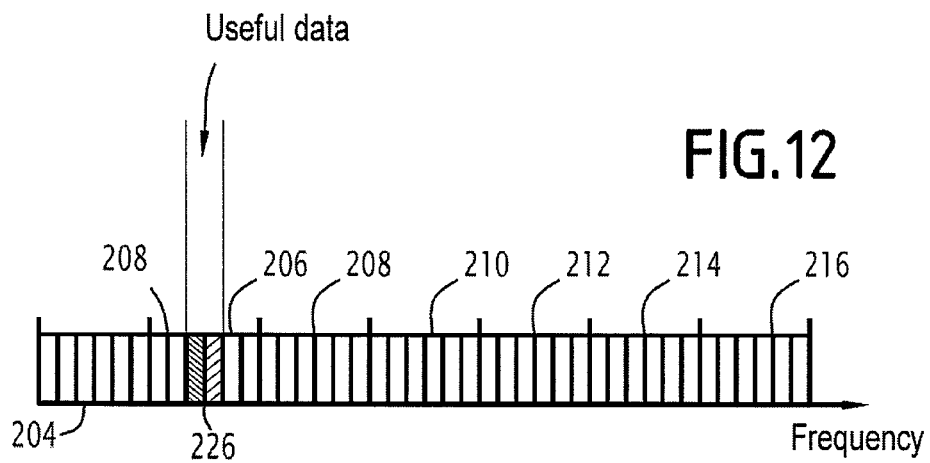
FIG. 12 is a view of the transmission channel selected by the terminal when it is in the first position.

According to FIG. 12, two units of the sub-band 226 are allocated to the transmission channel of the terminal 12.

Figure 13:
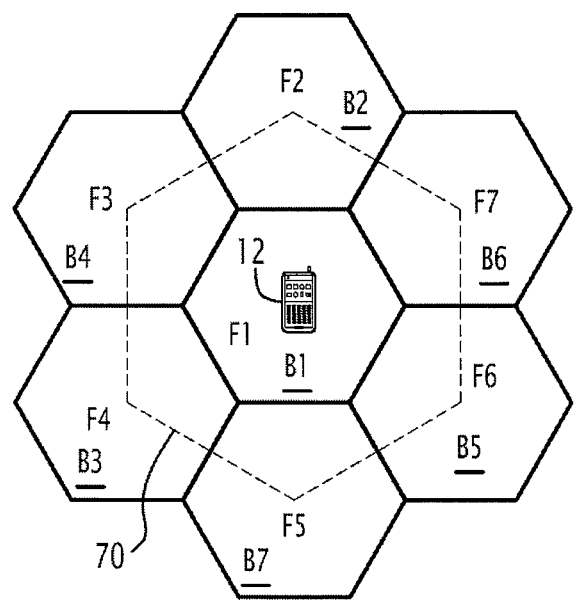
FIG. 13 is a view of a second relative position of the terminal in relation to the satellite cells of the cluster of FIG. 10.

According to FIG. 13, a second position of the terminal 12 in relation to the first bouquet 60 is shown at a second moment t2, after the first moment t1.

It appears that the position of the terminal 12 has evolved relative to the beams and attests to a relative movement.

It is of little importance whether the relative movement of the terminal is caused by the movement of the terminal in relation to the earth or by the misalignment of the antenna of the satellite.

In the second position, the terminal 12 is situated in the coverage of the beam F1 that operates in the band B1.

The terminal 11 is still attached to the first virtual cell 70 managed by the first control unit.

Figure 14:
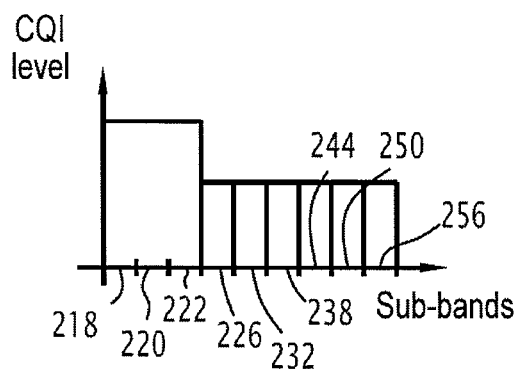
FIG. 14 is a view of the reception status by the terminal of the powers received in the various frequency sub-bands of the virtual cell when the terminal is in the second position of FIG. 13.

According to FIG. 14, the terminal is found under transmission conditions favorable to receiving, in order of preference, signals in the entire band B1, i.e. in all three sub-bands 218, 220, 222, then in the sub-bands 226, 232, 238, 244, 250, 256 respectively included in the band B2, B3, B4, B5, B6, B7.

Figure 15:
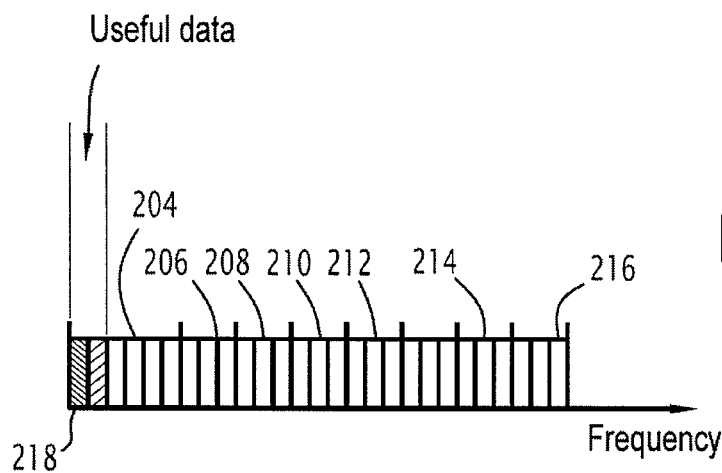
FIG. 15 is a view of the transmission channel selected by the terminal when it is in the second position.

According to FIG. 15, the two units of the sub-band 218 are assigned to the transmission channel of the terminal 12.

Figure 16:
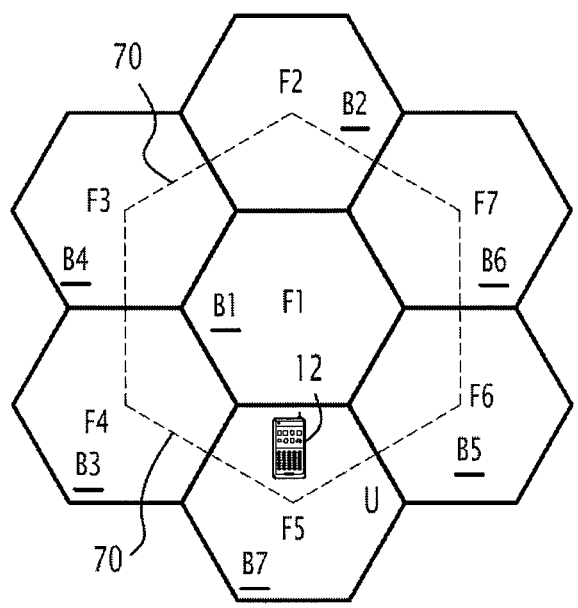
FIG. 16 is a view of a third relative position of the terminal in relation to the satellite cells of the cluster of FIG. 10.

According to FIG. 16, a third position of the terminal 12 in relation to the first cluster 60 is shown at a third moment t3, after the second moment t2.

In this configuration, the terminal 12 is situated in the coverage of the beam F5 that operates in the band B7.

The terminal 12 is still attached to the first virtual cell 70 managed by the first control unit 102.

Figure 17:
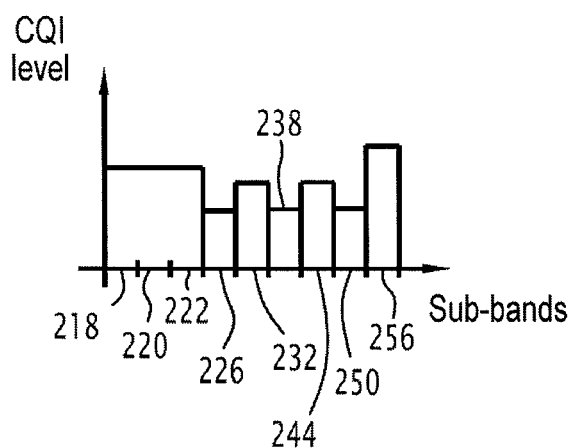
FIG. 17 is a view of the reception status by the terminal of the powers received in the various frequency bands when the terminal is in the third position of FIG. 16.

According to FIG. 17, the terminal 12 is found under transmission conditions favorable to receiving, in order of preference, signals in the sub-band 256 of band B7, then in the sub-band 244 of B5 and the sub-band 252 of B3, then in the sub-band 250 of B6, the sub-band 238 of B4 and the sub-band 226 of B2.

Figure 18:
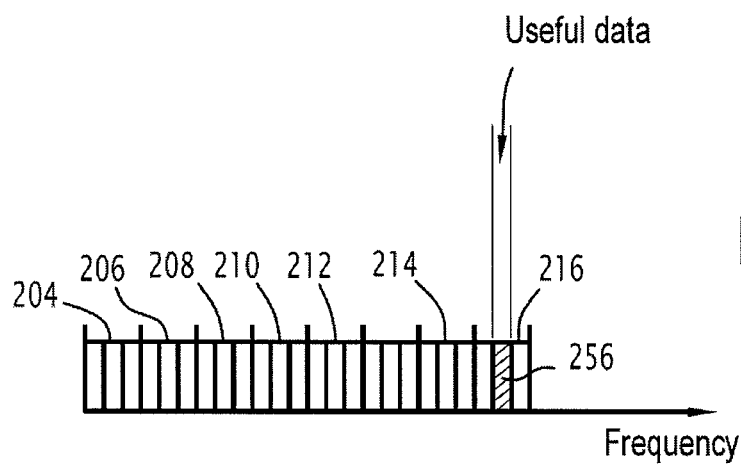
FIG. 18 is a view of the transmission channel selected by the terminal when it is in the third position.

According to FIG. 18, the two frequency units of the sub-band 256 are assigned to the link of the terminal 12.

Figure 19:
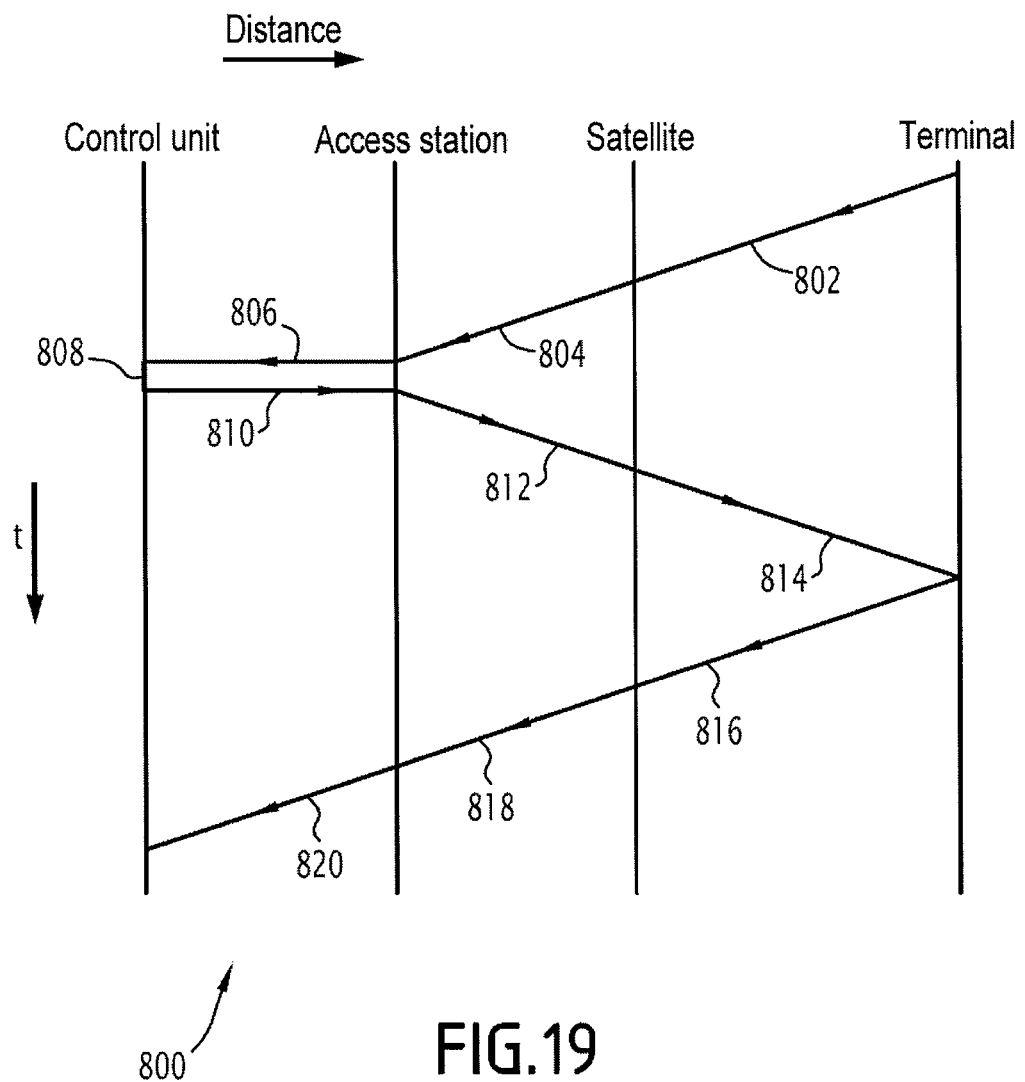
FIG. 19 is a flowchart of a method for changing transmission resources within a same virtual cell.

According to FIG. 19, a method for changing transmission resources 800 within a same virtual cell comprises a series of steps 802, 804, 806, 808, 810, 812, 814, 816, 818, 820.

In the first step 802, the terminal, previously attached to a virtual cell, has a first list of frequency sub-bands used in the virtual cell, and performs a wide band measurement of the transmission quality of each sub-band of the virtual cell to which it is attached, all of the sub-bands of the virtual cell belonging to a same cluster of beams or to several clusters of beams.

In the same step 802, the terminal sends to the satellite, on a first transmission channel using one or more sub-bands of the virtual cell to which it is attached, a first message containing information representative of the transmission quality of each sub-band administered by the control unit of the virtual cell.

In the second step 804, the satellite retransmits, toward one or several satellite access stations, the first message as a function of the sub-band(s) of the first channel.

In step 806, the access station(s) previously configured to point the message contained in the sub-band(s) of the received message toward the associated control unit, send the first message to the control unit associated with the current virtual cell to which the terminal is attached.

In step 808, the control unit, from quality information of the sub-bands of the current virtual cell and a list of the free channels of the same virtual cell, determines the transmission parameters of a second channel comprising one or more sub-bands for which the wireless receiving conditions are more favorable than those of the first channel, when such a second channel exists.

In the same step 808, the control unit reserves the sub-band(s) of the second transmission channel and prepares a second message intended for the terminal containing identification information for the new sub-band(s) of the second channel and in order to switch from the first channel to the second channel.

In step 810, the control unit sends the second message to the transposition units of one or more access station(s) corresponding to the sub-band(s) and the beam(s) used by the first channel.

In step 812, the access station(s) relay the second message to the beam(s) currently in force, in which the first message circulated.

In the following step 814, the satellite retransmits the second message to the terminal.

In step 816, upon reception and decoding of the second message, the terminal executes the order to switch from the first channel to the second channel and sends the satellite any subsequent new message or third service or signal message on the sub-band(s) used by the second channel.

In step 818, the satellite retransmits the third message from the terminal to the access station(s) making up the cluster.

In step 820, the access station(s), configured beforehand to point the third message to the control unit using the sub-band(s) of the second transmission channel, send the third message to the control unit associated with the virtual cell on which the terminal depends.

In the same step 820, the control unit verifies the effectiveness of the switching to the second channel, and releases the frequency and spatial resources of the first channel, i.e. the sub-band(s) and the associated beam(s), attributed to the second channel.

Figure 20:
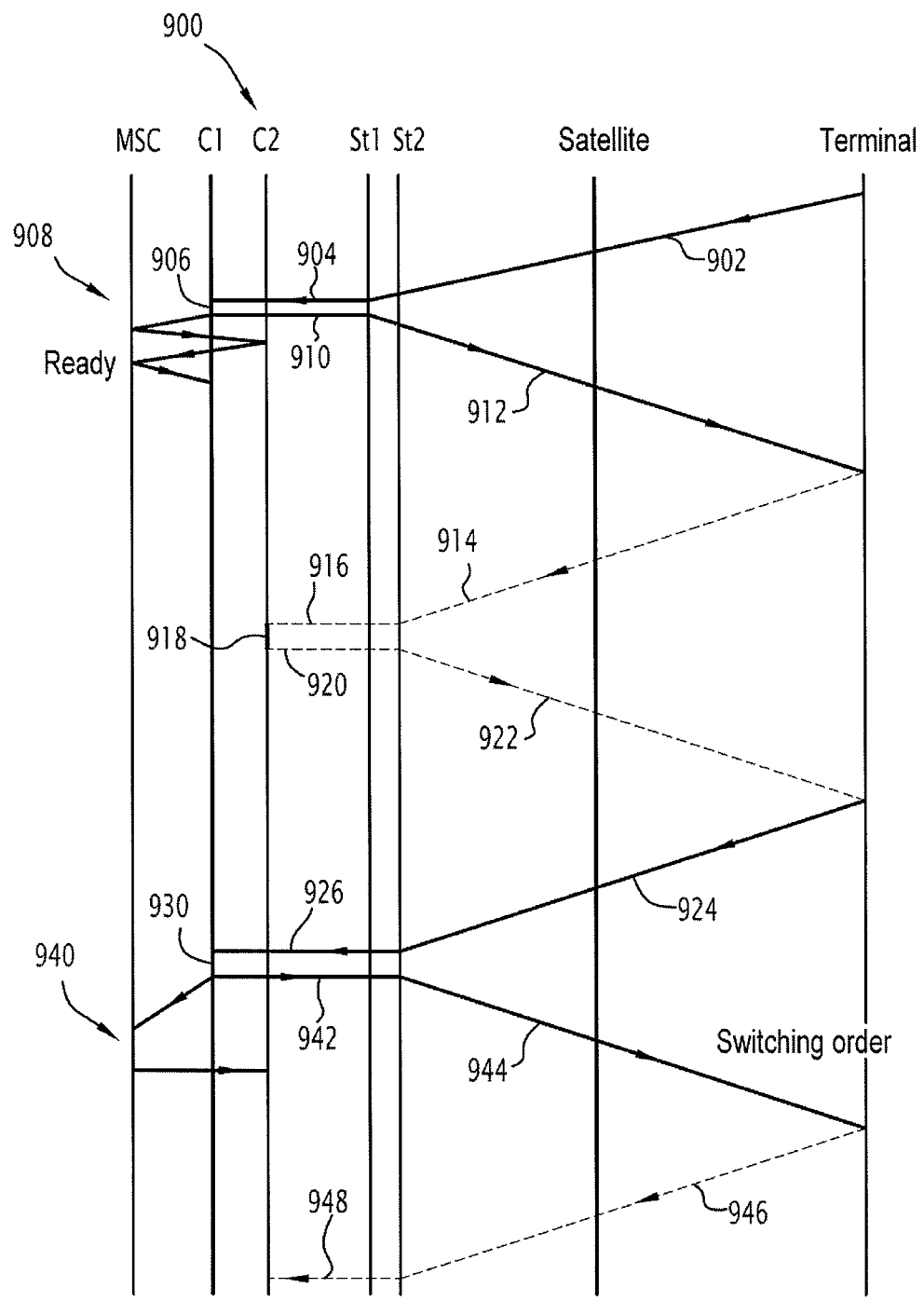
FIG. 20 is a flowchart of a method for changing transmission resources with changing of the virtual cell.

According to FIG. 20, a method for changing transmission resources with changing of the virtual cell comprises a series of steps with exchanges of messages through wireless signals between the various communication entities of the system of FIG. 1.

The communication entities comprise a terminal, a satellite, one or more satellite access station(s) of a first group of access stations designated St1, one or more satellite access station(s) of a second access group designated St2, a first control unit of a first virtual cell, designated C1, a second control unit of a second virtual cell, designated C2, and a mobile switching center with a high-throughput, designated MSC.

Here, the first control unit C1 one of the first virtual cell is configured to manage at least part of the transmission resources in terms of sub-bands and beams of the access station(s) of the first group St1.

Here, the second control unit C2 of the second virtual cell is configured to manage at least part of the transmission resources in terms of sub-bands and beams of the access station(s) of the second group St2.

It should be noted that any group of access stations among St1 and St2 may be limited to a single satellite access station.

Beforehand, for each control unit of a virtual cell, a permanent or modifiable architecture of connections of the control unit to the access station(s) has been implemented to point the messages to the beams. This architecture can be broken down, in terms of connections, into frequency band transposition units, and in terms of connections, into frequency sub-band transposition units.

In a first step 902, the terminal, previously attached to the first virtual cell as current virtual cell, has a first list of frequency sub-bands used in the first virtual cell, and performs a wide band measurement on the transmission quality of each frequency sub-band of the first virtual cell.

In the same step 902, the terminal sends to the satellite, on a first transmission channel currently in force and using one or more frequency sub-bands, a first message containing information representative of the quality of each sub-band administered by the control unit of the first virtual cell currently in force.

In this way, a configuration in which two sub-bands are managed by the same control unit and are each associated with a different beam and/or a different cluster is possible.

In the same step 902, the satellite retransmits the first message transmitted by the terminal to the first access station(s) of the beam formation group St1.

In a subsequent step 904, the access station(s) of the first group St1, configured beforehand to point the first message, using the sub-band(s) of the first channel, toward the first control unit of the first virtual cell, sends the first message to the first virtual cell control unit.

In a subsequent step 906, the first control unit C1, from quality information of the sub-bands of the first virtual cell and a set of second lists of transmission resources of the virtual cells adjacent to the first virtual cell in terms of beams, determines whether a change of resources and virtual cell is required.

When a change of virtual cell is required, in the same step 906, the first control unit C1 determines the adjacent second virtual cell in terms of beams most capable of ensuring good propagation conditions for a long period of time.

The second virtual cell on which the switching of the channel has been decided is associated with the second control unit.

Two steps 908 and 910 are then carried out in parallel.

In a step 908, a new connection or new high-throughput circuit on the high-throughput network side is prepared by the mobile switching center MSC and the two virtual cell control units C1, C2 through signal exchanges. When the new connection circuit to the high-throughput network is ready, a notice of that availability and reservation status of the new connection circuit is sent to the first virtual cell control unit C1.

In step 910, the first virtual cell control unit C1 sends the access station(s) of the first group St1 a second message at the terminal using the sub-band(s) assigned to the first channel currently in force.

The second message comprises an order to prepare switching to a second channel, identification information for the second virtual cell to which to switch, and a third list of sub-bands to be scanned to perform a wide band measurement of all of the channels offered by the second virtual cell, and the characteristics of a permanently active signal channel shared with the second virtual cell.

In a subsequent step 912, the access station(s) of the first group St1 send the second message intended for the terminal to the satellite on the first channel currently in force and made up of one or more sub-band(s).

In the same step 912, the satellite retransmits the second message to the terminal toward the terminal.

In a subsequent step 914, the terminal receives the second message and decodes it.

In the same step 914, the terminal sends the satellite, in the permanent signal channel shared by the second virtual cell, a third message containing information representative of the wide band quality of each sub-band administered by the control unit of the second virtual cell C2.

In the same step 914, the satellite retransmits the third message to the access station(s) of the second group St2 configured to serve the second shared signal channel through a specific sub-band partially or completely allocated.

In a subsequent step 916, the access station(s) of the second group St2, configured beforehand to point the third message using the narrow specific sub-band allocated to the specific signal channel shared by the second virtual cell, send the third message to the second virtual cell control unit C2.

In a subsequent step 918, the control unit C2, from quality information of the sub-bands of the second measured virtual cell, determined and supplied by the terminal and from a fourth list of free transmission channels of the second virtual cell, determines a third channel or new channel made up of one or more sub-bands comprised in the fourth list of free channels of the second virtual cell.

In the same step 918, the second control unit C2 reserves the sub-band(s) of the third channel, and prepares a fourth message to the terminal containing identification information of the third channel and the sub-band(s) allocated to third channel.

In a subsequent step 920, the second control unit C2 sends the fourth message to the access station(s) of the second group St2 on the second signal channel.

In a subsequent step 922, the access station(s) of the second group St2 relay the fourth message on one or more transposition units corresponding to one or more beams associated with the second dedicated signal channel.

In the same step 922, the satellite retransmits, to the terminal on the beam(s) associated with the second dedicated signal channel, the fourth message sent by the access station(s) of the second group St2.

In a subsequent step 924, the terminal receives and decodes the fourth message, and stores the information for the new sub-band(s) allocated by the second control unit C2.

Then, in the same step 924, the terminal sends a fifth message to the access station(s) of the first group St1, through the satellite, indicating that the terminal is ready to switch to the third channel or new channel of the second virtual cell.

In a subsequent step 926, the access station(s) of the first group St1 transpose the fifth message into one or more sub-band(s) corresponding to the sub-band(s) and the beam(s) used by the first channel, and convey the fifth message to the first control unit C1.

In a subsequent step 930, the first control unit C1 receives and decodes the fifth message announcing that the terminal is ready to switch to the new channel or third channel.

In the same step 930, the first control unit C1 prepares a sixth message to the terminal containing an order to switch to the second control unit of the second virtual cell and to use the new transmission channel.

After step 930, two steps 940 and 942 are carried out in parallel.

In step 940, the second control unit C2 sends an order to the mobile switching center MSC to activate the second connection between the second control unit C2 and the high-throughput network. The mobile switching center MSC then sends a seventh message to the second control station C2 according to which the second high-throughput connection operates.

In step 942, the first control unit C1 sends the first access station or the access stations of the first group St1 the sixth message intended for the terminal and containing the order to switch to the third channel.

In step 944, the access station(s) of the first group St1 convey the sixth message to the terminal through the satellite.

The sixth message is conveyed in the sub-band(s) of the first channel currently in force and contained in the first beam(s).

As long as the connection unit has not received a message from the MSC according to which the switching operates, the first sub-band(s) remain allocated to the terminal.

In step 946, the terminal executes the switching order by transmitting any subsequent new message on the sub-band(s) of the third channel to the access station(s) of the second group St2 through the satellite.

In a subsequent step 948, the access station(s) of the second group St2 send each new message to the second control unit C2.

It should be noted that when the MSC has detected that the switching has been done correctly, it sends an authorization to the first control unit to release the first channel(s) contained in the first sub-band(s).

Alternatively, a method for switching resources between two virtual cells may involve a single access station for which a first portion of the resources in terms of sub-band is managed by the first virtual cell control station C1, and a second portion of its resources in terms of sub-band is managed by the second virtual cell control station C2.

In the method for changing resources between two virtual cells, a much longer implementation time appears than the implementation time for the method for changing resources within a same virtual cell due to the longer round-trip time in the case of a satellite communication system and a larger number of exchanges required in the case of a virtual cell change.

The interest of using a virtual cell corresponding to a high number of beams is apparent, since the time and signal volume required to change resources within a same virtual cell are smaller.

Furthermore, there should be more control units and the number of access stations attached per control unit should be limited, so as to limit the processing per computation unit.

The ability of the terminal to probe the channels of a same virtual cell over a wide band and to use at least two sub-bands belonging to two different frequency bands makes it possible to increase the transmission resource management flexibility by not limiting that management to taking the form and distribution of the beams into account, but by extending it to take jams of terminals operating in the same beam into account.

The possibility of using a multi-beam channel makes it possible to eliminate this difficulty when the beams move relatively quickly in relation to the terminals.

What is claimed is:

1. A satellite cellular radio-communication system comprising:
    the communication satellite being configured to transmit on the second outbound downlink and to receive on the second inbound uplink the service and signal messages received and transmitted by the set of user terminals, the service and signal messages being divided into a set of radio-communication satellite beams,
    each user terminal being associated with one virtual cell and being configured to receive, from the control unit of the associated virtual cell, and run a configuration command for a transmission channel to transmit and receive messages therein, the channel using at least two frequency and spatial resources at the same time having different band indices,
    each control unit being configured to manage the frequency and spatial resources of the associated virtual cell associated therewith, and to make the messages received and transmitted by the user terminals affected to the virtual cell of the control unit pass through.

2. The satellite cellular radio-communication system as recited claim 1 wherein each sub-band has a wide bandwidth greater than or equal to 2.5 MHz, and each user terminal associated with the virtual cell is configured to measure transmission quality of each sub-band of the virtual cell at the same time.

3. The satellite cellular radio-communication system as recited claim 1 wherein the number of sub-bands per frequency band is constant, and the sub-bands of a same band have the same width.

4. The satellite cellular radio-communication system as recited claim 1 wherein each control unit includes a different reference clock and is configured to synchronize the service and signal messages transmitted and received by each user terminal of the associated virtual cell with a reference clock of the associated virtual cell.

5. The satellite cellular radio-communication system as recited claim 1 wherein each satellite access station is configured to transmit and receive messages corresponding to the associated compact cluster, each satellite access station being connected to the one or more of the control units managing the frequency and spatial resources whereof the beam indices correspond to the beams of the compact cluster associated with the satellite access station.

6. The satellite cellular radio-communication system as recited claim 1 wherein each satellite access station is served by at least two control units, at least one of the control units that serves the satellite access station serving all of its frequency and spatial resources on the satellite access station.

7. The satellite cellular radio-communication system as recited claim 1 wherein each control unit serves at least two satellite access stations.

8. The satellite cellular radio-communication system as recited claim 1 wherein one satellite access station is served by one single control unit, and the one single control unit serves only the one satellite access station.

* * * * *